(12) United States Patent
Watson et al.

(10) Patent No.: US 8,773,499 B2
(45) Date of Patent: Jul. 8, 2014

(54) AUTOMATIC VIDEO FRAMING

(75) Inventors: Josh Watson, Seattle, WA (US); Simone Leorin, Redmond, WA (US); Ross G. Cutler, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 573 days.

(21) Appl. No.: 13/168,656

(22) Filed: Jun. 24, 2011

(65) Prior Publication Data

US 2012/0327179 A1 Dec. 27, 2012

(51) Int. Cl.
H04N 7/14 (2006.01)

(52) U.S. Cl.
USPC .................................. 348/14.15; 348/14.12

(58) Field of Classification Search
USPC ............ 348/14.01, 14.1, 14.14, 14.15, 14.16, 348/14.07, 14.12
See application file for complete search history.

(56) References Cited

U.S. PATENT DOCUMENTS

| | | | |
|---|---|---|---|
| 2001/0046309 A1 | 11/2001 | Kamei | |
| 2008/0184124 A1* | 7/2008 | Agarwal et al. | 715/733 |
| 2008/0292140 A1 | 11/2008 | Morris et al. | |
| 2010/0142815 A1 | 6/2010 | Sim | |
| 2011/0085017 A1* | 4/2011 | Robinson et al. | 348/14.08 |
| 2011/0090311 A1* | 4/2011 | Fang et al. | 348/43 |
| 2011/0096140 A1* | 4/2011 | Samadani et al. | 348/14.16 |
| 2011/0242277 A1* | 10/2011 | Do et al. | 348/43 |
| 2011/0249190 A1* | 10/2011 | Nguyen et al. | 348/708 |
| 2012/0026277 A1* | 2/2012 | Malzbender et al. | 348/14.07 |
| 2012/0050458 A1* | 3/2012 | Mauchly et al. | 348/14.16 |
| 2012/0274736 A1* | 11/2012 | Robinson et al. | 348/14.16 |

OTHER PUBLICATIONS

Hu, et al., "Principal Axis-Based Correspondence between Multiple Cameras for People tracking", Retrieved at <<http://ieeexplore.ieee.org/stamp/stamp.jsp?tp=&arnumber=1597123>>, IEEE Transactions on Pattern Analysis and Machine Intelligence, vol. 28, No. 4, Apr. 2006, pp. 663-671.

Hampapur, et al., "Face Cataloger: Multi-Scale Imaging for Relating Identity to Location", Retrieved at <<http://domino.watson.ibm.com/comm/research_projects.nsf/pages/s3.pubs.html/$FILE/FaceCataloger.PDF>>, IEEE Conference on Advanced Video and Signal Based Surveillance, Jul. 21-22, 2003, pp. 8.

Wilson, et al., "Combining Multiple Depth Cameras and Projectors for Interactions On, Above, and Between Surfaces", Retrieved at <<http://research.microsoft.com/en-us/um/people/awilson/publications/wilsonuist2010/wilson%20uist%202010%20lightspace.pdf>>, Oct. 3, 2010, pp. 10.

(Continued)

*Primary Examiner* — Olisa Anwah
(74) *Attorney, Agent, or Firm* — Andrew Smith; Jim Ross; Micky Minhas

(57) ABSTRACT

A dynamically adjustable framed view of occupants in a room is captured through an automatic framing system. The system employs a camera system, including a pan/tilt/zoom (PTZ) camera and one or more depth cameras, to automatically locate occupants in a room and adjust the PTZ camera's pan, tilt, and zoom settings to focus in on the occupants and center them in the main video frame. The depth cameras may distinguish between occupants and inanimate objects and adaptively determine the location of the occupants in the room. The PTZ camera may be calibrated with the depth cameras in order to use the location information determined by the depth cameras to automatically center the occupants in the main video frame for a framed view. Additionally, the system may track position changes in the room and may dynamically adjust and update the framed view when changes occur.

20 Claims, 7 Drawing Sheets

(56) References Cited

OTHER PUBLICATIONS

Nguyen, et al., "More than Face-to-Face Empathy Effects of Video Framing", Retrieved at <<http://bid.berkeley.edu/files/papers/CHIempathy09.pdf>>, 2009, pp. 423-432.

Gaspar, et al., "New Depth from Focus Method for 3D PTZ Camera Target Tracking", Retrieved at <<http://users.isr.ist.utl.pt/~pjcro/courses/dsfps0910/docs/prts/DSFPS2010%20-%20DFF%20-%20TG.pdf>>, Retrieved Date: Apr. 4, 2011, pp. 4.

* cited by examiner

AUTOMATIC VIDEO FRAMING

BACKGROUND

Conferences and meetings commonly converge in places such as conference rooms, convention centers and private offices, where one or more people may confer with others and may give presentations to other occupants in the room. Video cameras are commonly used during meetings in order to record the meetings for future use or to transmit through networked communications for virtual meetings. Typically, in such video conferences, it is desired to frame the room occupants or meeting participants in order to get a clear, focused and high resolution view of the people in the room in the video frame.

Often times, framing the room occupants using a pan, tilt, and zoom camera (PTZ camera) can be a time consuming and tedious process, as the camera needs to be manually adjusted by a user to locate and zoom on occupants. As a result, users often do not adjust the camera and the video camera typically captures an entire view of the room, including empty surrounding environment, rather than an optimal view where the participants are the focus. Some automatic framing systems may enable a camera to automatically adjust the camera settings to frame the participants as the focus of the video frame using face detection methods. However, face detection methods may be inconsistent, as they break down in low light scenarios the system has trouble locating facial features, and when only partial or occluded views of participants' faces are available during a meeting because the system has trouble locating facial features.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to providing an optimal framed view of occupants in a room through an automatic framing system. A system according to embodiments may utilize a cameras system, including a pan/tilt/zoom (PTZ) camera and one or more depth cameras, to automatically locate occupants in a room and adjust the PTZ camera's pan, tilt, and zoom settings to focus in on the occupants and center them in the main video frame. The depth cameras may distinguish between occupants and inanimate objects in a room and may adaptively determine the location of the occupants in the room. The PTZ camera may be calibrated with the depth cameras in order to employ the location information determined by the depth cameras to automatically center the occupants in the main video frame for a dynamically adjustable framed view. Additionally, the system may track position changes in the room and may dynamically adjust and update the framed view when changes occur.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
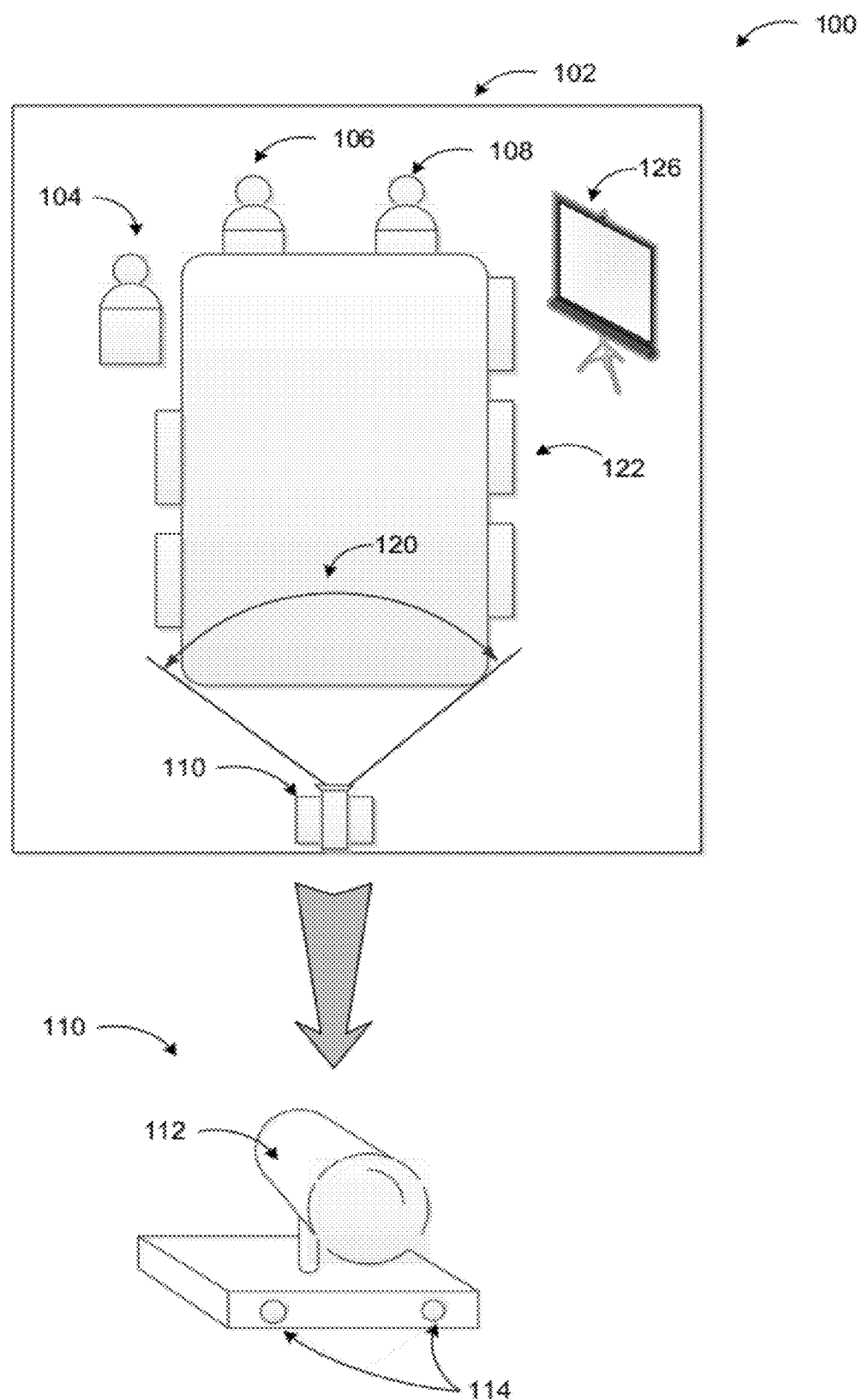
FIG. 1 illustrates an example video conference room environment that includes a PTZ—depth camera combination for capturing meetings.

As briefly described above, an optimal framed view of occupants in a room may be provided through an automatic framing system. The system may utilize a camera system, including a pan/tilt/zoom (PTZ) camera and one or more depth cameras, to automatically locate occupants in a room and adjust the PTZ camera's pan, tilt, and zoom settings to focus in on the occupants and center them in the main video frame. The depth cameras may distinguish between occupants and inanimate objects and may adaptively determine the location of the occupants in the room. The PTZ camera may be calibrated with the depth cameras in order to use the location information determined by the depth cameras to automatically center the occupants in the main video frame for an optimal framed view. Additionally, the system may track position changes in the room and may dynamically adjust and update the optimal framed view when changes occur.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media.

Throughout this specification, the term "platform" may be a combination of software and hardware components for providing communication services including, but not limited to, video conferencing systems. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example FIG. 1 illustrates an example of a video conference room environment, where a video camera system 110 may be utilized for filming a meeting or conference taking place in the conference room 102. As illustrated in diagram 100, a video camera system 110 may be situated in the conference room 102 such that the camera system 110 may have a wide field of view 120 of the conference room. The wide field of view 120 of the video camera system 110 may be able to capture the occupants of the conference room 102 who are participants 104, 106, 108 in a meeting in the conference room 102, as well as the inanimate objects in the room, such as the tables and chairs 122, projection screen 126, or whiteboards. The video camera system 110 may allow the automatic framing of occupants in the room in order to optimize the visual experience during a video conference, providing a framed view of the participants 104, 106, 108 and eliminating wasted space in the video frame.

According to an example embodiment, using methods of depth and position measurement, the video camera system 110 may be able to determine the location of the occupants in the room and automatically adjust the pan, tilt and zoom settings of the video camera system 110 to focus in on the occupants, centering the occupants in the main video frame. Additionally, the camera system 110 may be configured to dynamically adjust the settings and update the framed view when changes happen in the conference room 102, such as for example, when a person enters or exits the meeting, or when a person changes their location in the room. The depth cameras 114 may track the changes, determine the new position of the occupants, and based on the new determined position of the occupants, the PTZ camera 112 may adjust its settings for a more optimal view of the occupants.

In an example embodiment, the video camera system 110 may include a PTZ camera (pan/tilt/zoom camera) 112, which may be a monochrome or color PTZ camera, and one or more depth cameras 114. The depth cameras 114 may be used to adaptively determine the location of the occupants and inanimate objects in the room, and the PTZ camera 112 may be coordinated with the depth cameras 114, such that the PTZ camera 112 may use the location information to automatically center the occupants in the main video frame. The depth cameras may utilize depth sensors, which may be configured to identify and distinguish people even in low light scenarios or when only partial facial views may be available.

The PTZ camera 112 may be wholly mechanical, wholly digital or a combination of mechanical and digital, and may be configured to adjust its pan, tilt, and zoom settings in order to automatically frame the occupants in a room as the main focus of the video frame.

The depth cameras 114 may be configured to determine the position of the objects and occupants in the room 102 according to a specified calibration table. Using the calibration table, the depth cameras 114 may map the specific pixel location in a depth camera coordinate system corresponding to the actual physical location of the objects and occupants in the room using a variety of location measuring methods, such as measuring the azimuth and elevation $(\theta,\phi)$. The PTZ camera 112 may be synchronized with the depth camera 114 calibration, and using the position information determined by the depth cameras 114, the PTZ camera 112 may automatically adjust its settings to pan and zoom to the azimuth and elevation location $(\theta,\phi)$ of the occupants as determined by the depth camera 114 to frame the occupants in the room in the main video frame.

Figure 2:
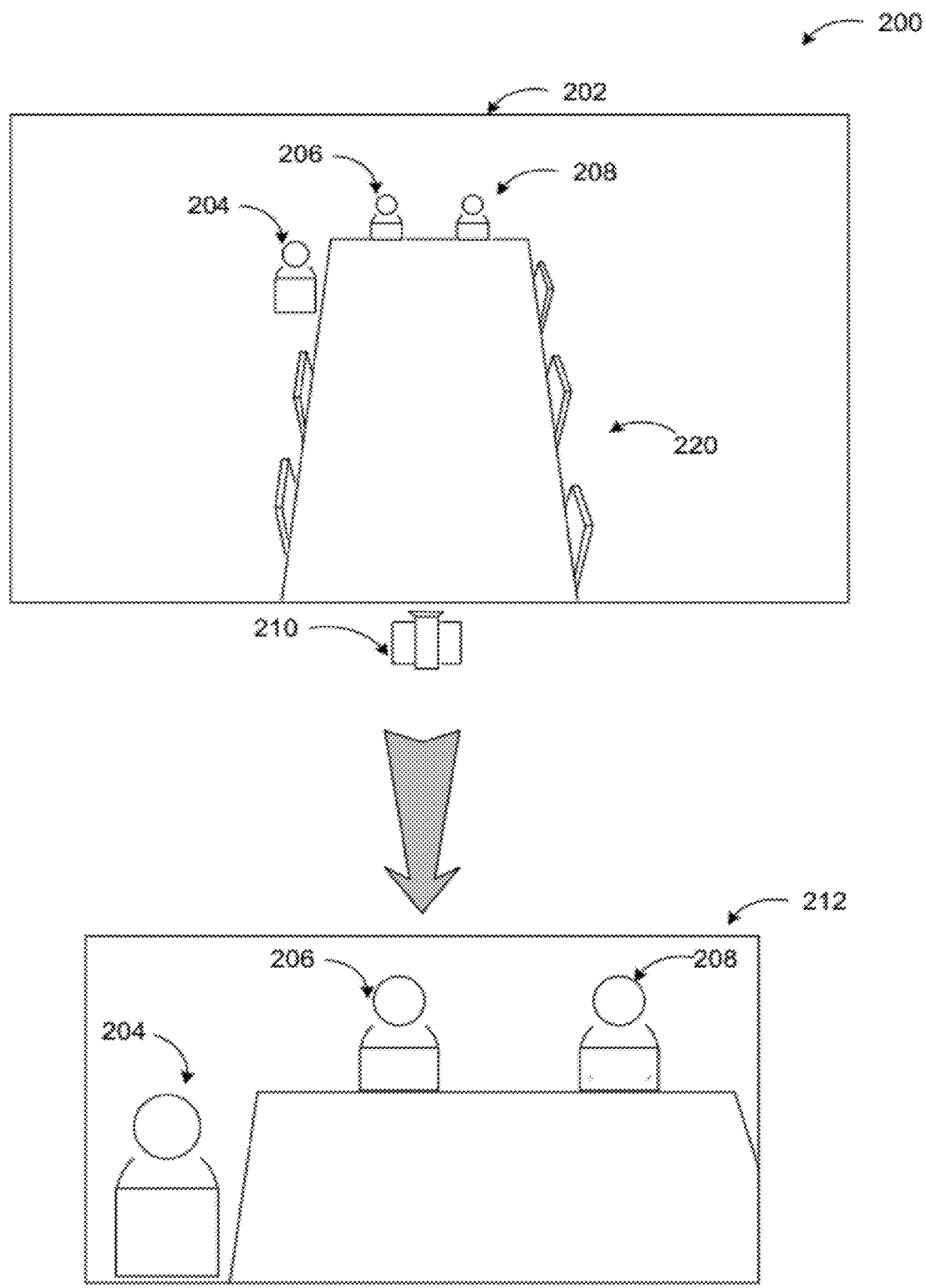
FIG. 2 illustrates an example of an automatic framed view in a video conference room environment.

FIG. 2 illustrates an example of an automatic framed view in a video conference room environment. As demonstrated in diagram 200, a combination of depth cameras and a PTZ camera may be used to automate the framing process so that the PTZ camera system 210 may automatically locate occupants in a room 202 and frame the occupants accordingly to produce a framed view 212 without excess wasted space. In typical video conference situations, a camera must be manually adjusted to produce an optimal framed view of the meeting framed view 212 or the camera may produce a view of the entire room 202 including wasted space and where the occupants 204, 206, and 208 are not the focus of the video frame.

In a system according to embodiments, a PTZ camera system 210 may be configured to automatically produce a framed view 212 of the occupants 204, 206, and 208 for an framed viewing experience with the occupants 204, 206, and 208 as the focus of the main video frame. The PTZ camera system 210 may be able to capture an entire room 202 in the camera system's field of view, such that it can capture the occupants in the room as well as all of the inanimate objects 220 contained in the room. The PTZ camera system 210 may include a PTZ camera and one or more depth cameras calibrated with the PTZ camera for identifying the occupants and the inanimate objects in a room and determining their actual physical location in the room 202. The depth cameras may be configured to use depth sensors to identify occupants in the room, and may determine their location in the room by mapping their location in the depth camera coordinate system corresponding to the azimuth and elevation location of the occupants in the room 202. The depth cameras may also use the depth sensors to detect the inanimate objects 220 in the room such as walls, tables, chairs, and white boards, and may map the location of these inanimate objects 220 in the depth cameras' coordinate system for factoring their location into the framing rules in order to provide an optimal framed view 212.

In a system according to embodiments the PTZ camera and the depth cameras may be synchronized such that the PTZ camera may be able to use the location information determined by the depth cameras to adjust the PTZ camera's pan, tilt, and zoom settings to frame the occupants in the main video frame. The PTZ camera may be configured to monitor the wide field of view of the entire room 202, and when the depth cameras identify, locate and determine the position of the occupants in the room, the PTZ camera may be configured to pan and/or tilt in a direction towards the occupants 204, 206, and 208, and to initiate a zoom mode where the PTZ camera may zoom in on the occupants 204, 206, and 208. For example, as shown in diagram 200, the depth cameras may identify the occupants 204, 206, and 208 sitting at the back left hand side of the conference table. The depth cameras may associate this position with an azimuth and elevation that may be mapped in the depth camera coordinate system and synchronized with the PTZ camera. Using this position information, the PTZ camera may be able to pan in the horizontal and vertical directions to center the occupants 204, 206, and 208 in the main video frame, and additionally may be able to zoom in to maximize the size of the occupants in the main frame, producing a focused, higher resolution framed view 212 and eliminating the wasted space of the room 202 that is captured in the wide field of view.

In an example embodiment, the depth camera may determine the location of the occupants 204, 206, and 208 in a conference room 202 using depth sensors, which may measure the azimuth and elevation for the camera to capture the identified occupants 204, 206, and 208 corresponding to the depth cameras' coordinate system. The depth sensors may determine the minimum and maximum azimuth and elevation values for the locations of the occupants 204, 206, and 208 in the room, and the PTZ camera may use this azimuth and elevation range to produce the framed view 212. Based on the azimuth and elevation range, the PTZ camera system may determine the target azimuth and elevation value, which may be the mean of the minimum and maximum azimuth and elevation values, to which to adjust the pan and zoom settings for framing the occupants. The PTZ camera may accordingly pan and tilt such that the mean azimuth and elevation values may be the center of the frame, and may zoom in to the minimum and maximum azimuth and elevation values thus capturing the occupants in the main video frame, maximizing and centering the occupants 204, 206, 208, and eliminating the surrounding environment from the framed view 212.

Alternatively, the PTZ camera may be configured to keep the table or other inanimate object, such as a whiteboard or a display board as the center of the main video frame. Accordingly, the PTZ camera may consistently pan and tilt to keep the centered object at the center of the video frame, and may adjust the zoom settings to the minimum and maximum azimuth and elevation values of the detected occupants 204, 206, and 208, thus capturing the occupants 204, 206, and 208 in the main video frame, maximizing them and framing them relative to the centered object in the framed view 212.

In another example embodiment, the PTZ camera may be configured to produce a split screen framed view of the occupants. For instance, in the case where two or more occupants may be situated a fairly large distance apart or on opposite sides of the room, the PTZ camera may be limited to including the entire wide field of view of the entire room 202 in the main video frame in order to include all of the occupants in the framed view 212. In a system according to embodiments, the PTZ camera system 210 may be configured to capture the two or more occupants at each of their positions in the room and to frame each of the occupants individually. The PTZ camera system 210 may then generate a split screen, where each occupant is centered in a video frame, and the multiple video frames may be displayed concurrently in the main framed view 212. In order to produce a split screen in the framed view 212, the PTZ camera system 210 may include multiple PTZ cameras that may be coordinated for capturing the multiple occupants in the room. Alternatively the PTZ camera system 210 may operate on a recorded delay where the PTZ camera may be configured to film each occupant 204, 206, and 208 separately and then combine the separate film streams into a synchronized framed view 212.

Figure 3:
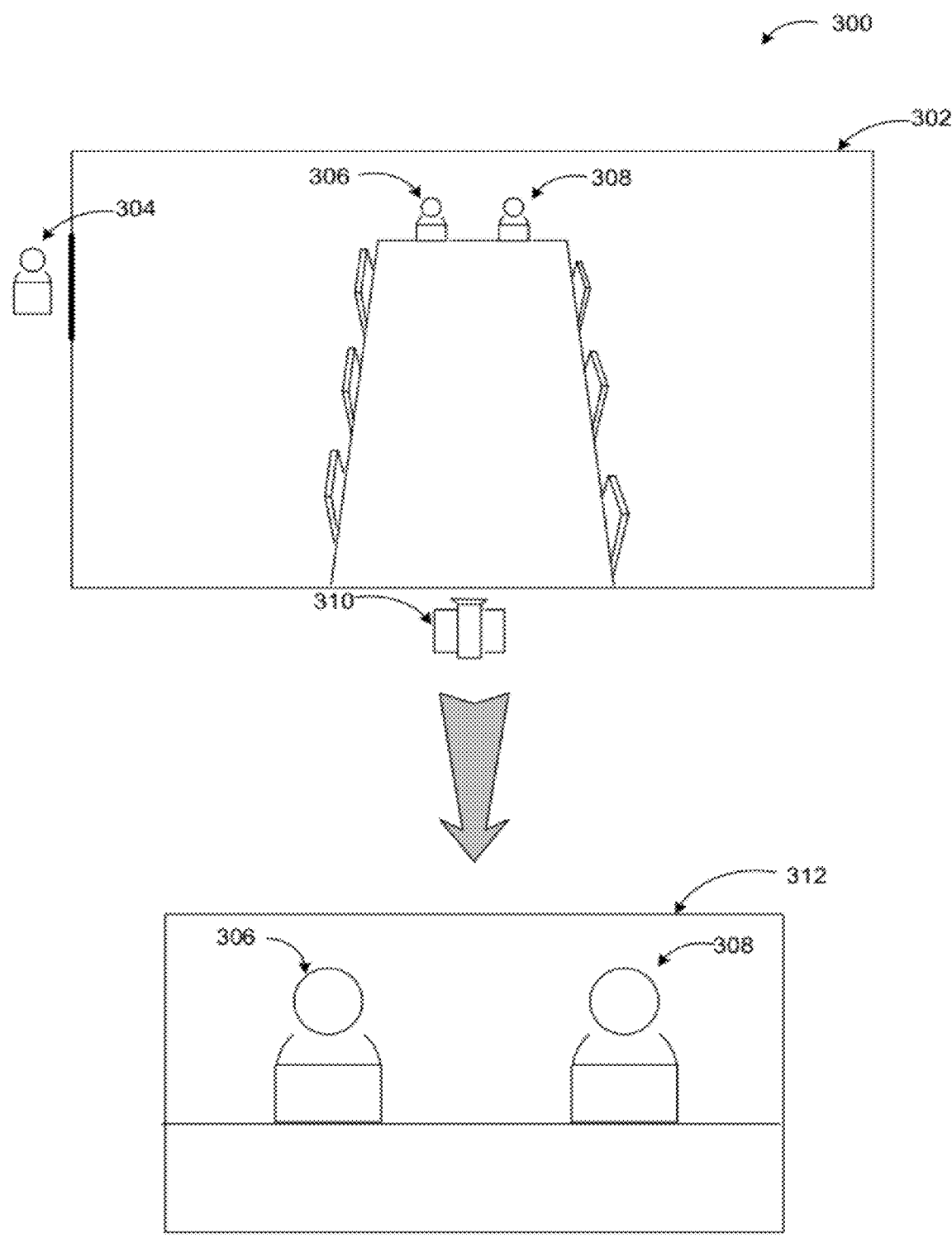
FIG. 3 illustrates an example of a dynamically adjusted framed view in a video conference room environment.

FIG. 3 illustrates an example of a dynamically adjusted framed view in a video conference room environment. In a system according to embodiments, the PTZ camera system 310 may dynamically track position changes or active events in a conference room 302 and may adjust the PTZ camera settings accordingly to accommodate the tracked events for displaying in an framed view 312. For example, during a conference, participants may enter and exit the room, may change seats in a room, or may stand up and move around the room to give a presentation or write on a whiteboard (interaction with inanimate objects). When a person enters or leaves the room or changes position in the room, the PTZ camera may dynamically adjust its pan, tilt and zoom settings to enhance framed view 312.

As demonstrated in diagram 300, initially the meeting may include multiple occupants 304, 306, and 308. As previously described in conjunction with FIG. 2, the PTZ camera system 210 may provide an optimal framed view 212 which centers and maximizes the multiple occupants in the main video frame. During the course of the meeting, an occupant 304 may exit the conference room 302, leaving only the remaining occupants 306 and 308. At this point, the original framed view 212 may include wasted surrounding space in the location where the exiting occupant 304 previously occupied. The PTZ camera system 310 may be configured to track the exiting occupant 304, and determine that the framed view 312 needs to be adjusted. As the PTZ camera system 310 detects that an occupant has exited the room 302, the depth cameras may accordingly measure the new range of determined minimum and maximum azimuth and elevation values for the remaining occupants 306, 308, and the PTZ camera may adjust according to the changed range values.

In an example embodiment, the PTZ camera may be configured to pan horizontally and vertically to keep the target azimuth and elevation value, which may be the mean of the minimum and maximum azimuth and elevation values, at the center of the framed view 312, and the PTZ camera may zoom in or out, in order to keep the new minimum and maximum azimuth and elevation values as the boundary values for the framed view 312. As a result, a dynamically adjusted optimal framed view 312 may be provided reflecting the change in the room 302 when an occupant exits, and centering and maximizing the remaining occupants 306 and 308 in the main video frame. Likewise, if an additional occupant enters the room, or an occupant moves to a new location in the room outside of the previously measured framed view 312, the PTZ camera system 310 may detect the changes, re-measure the range of minimum and maximum azimuth and elevation values, and pan out and zoom out to expand the video frame for producing an adjusted framed view 312 reflecting the tracked changes.

Figure 4:
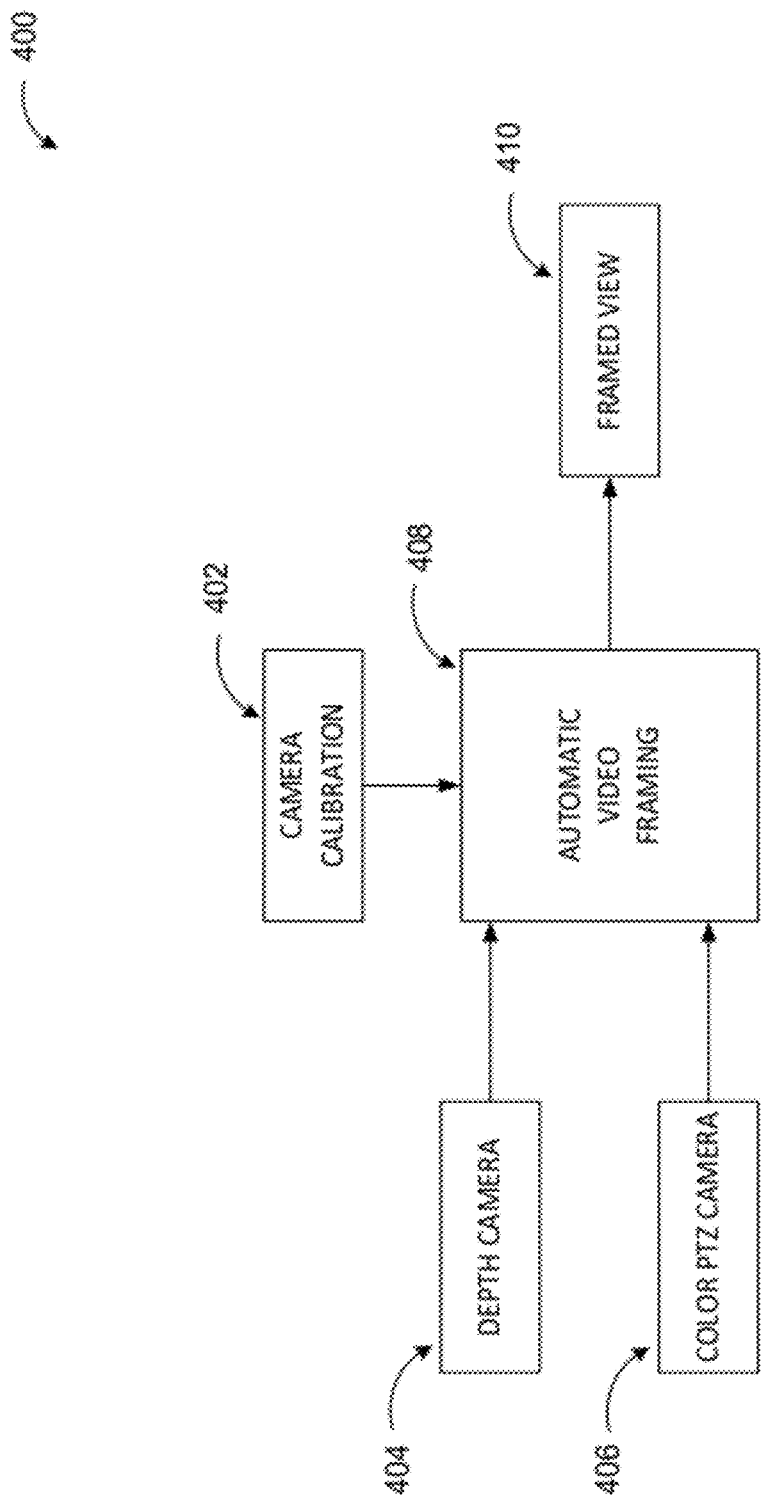
FIG. 4 illustrates example components of a system for providing an automatic framed view in a video conference room environment.

FIG. 4 illustrates example components of a system for providing an automatic framed view in a video conference room environment. As previously described in conjunction with FIG. 2, the system may include one or more depth cameras 404 and one or more PTZ cameras 406. The PTZ camera(s) 406 may capture a wide field of view of an entire room including the occupants of the conference, as well as the inanimate objects in the room, such as the tables and chairs, walls, projection screens or whiteboards. The depth cameras 404 may be used to identify people in the room and to detect the location of the people and inanimate objects in the room. The depth cameras 404 may map the physical location of the people and objects according to the depth camera's coordinate system which may correspond to measured azimuth and elevation levels for the physical locations in the room. The system may calculate the minimum azimuth and elevation range values that include the occupants in the room based on the input from the depth cameras 404.

Camera calibration module 402 may synchronize the location mapping coordinate system of the depth cameras 404 with the PTZ camera 406, such that the PTZ camera may use the location information determined by the depth cameras to adjust the PTZ camera settings for providing an optimal framed view. Using the location information determined by the depth cameras 404, the automatic video framing component 408 may enable the PTZ camera 406 to adjust the pan, tilt, and zoom settings to automatically center the occupants in the main video frame for producing a framed view 410. The automatic video framing component 408 may center the framed view around a target azimuth and elevation value, which may be the mean of the minimum and maximum determined azimuth and elevation values, and the zoom level may then be determined such that all of the occupants may be centered and maximized in the optimal framed view 410.

The example systems in FIG. 1 through 4 have been described with specific devices, applications, and interactions. Embodiments are not limited to systems according to these example configurations. A system for determining the location of occupants in a room and automatically providing a framed view of the occupants in a video conference environment may be implemented in configurations employing fewer or additional components and performing other tasks. Furthermore, specific protocols and/or interfaces may be implemented in a similar manner using the principles described herein.

Figure 5:
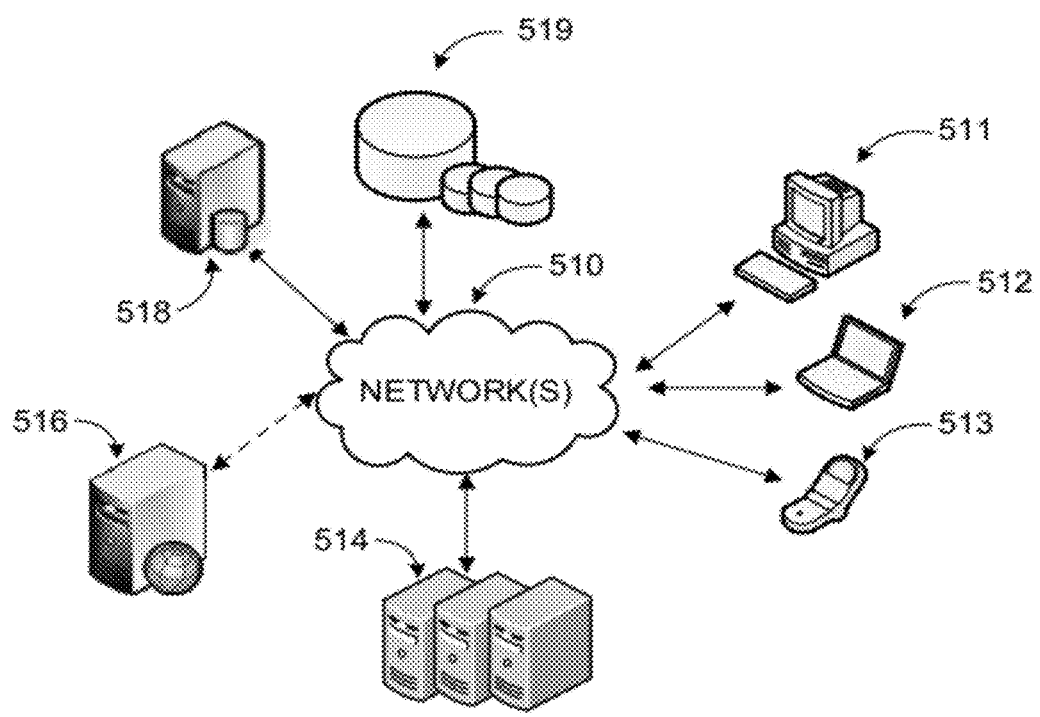
FIG. 5 is a networked environment, where a system according to embodiments may be implemented.

FIG. 5 is an example networked environment, where embodiments may be implemented. A system for determining the location of occupants in a room and automatically providing an optimal framed view of the occupants in a video conference environment may be implemented via software executed over one or more servers 514 such as a hosted service. The platform may communicate with client applications on individual computing devices such as a smart phone 513, a laptop computer 512, or desktop computer 511 ('client devices') through network(s) 510.

Client applications executed on any of the client devices 511-513 may facilitate communications via application(s) executed by servers 514, or on individual server 516. An application executed on one of the servers may facilitate the detection of a sharing mode environment and providing a presence status menu in a collaborative environment. The application may retrieve relevant data from data store(s) 519 directly or through database server 518, and provide requested services (e.g. document editing) to the user(s) through client devices 511-513.

Network(s) 510 may comprise any topology of servers, clients, Internet service providers, and communication media. A system according to embodiments may have a static or dynamic topology. Network(s) 510 may include secure networks such as an enterprise network, an unsecure network such as a wireless open network, or the Internet. Network(s) 510 may also coordinate communication over other networks such as Public Switched Telephone Network (PSTN) or cellular networks. Furthermore, network(s) 510 may include short range wireless networks such as Bluetooth or similar ones. Network(s) 510 provide communication between the nodes described herein. By way of example, and not limitation, network(s) 510 may include wireless media such as acoustic, RF, infrared and other wireless media.

Many other configurations of computing devices, applications, data sources, and data distribution systems may be employed to implement a platform for determining the location of occupants in a room and automatically providing a dynamically adjustable framed view of the occupants in a video conference environment. Furthermore, the networked environments discussed in FIG. 5 are for illustration purposes only. Embodiments are not limited to the example applications, modules, or processes.

Figure 6:
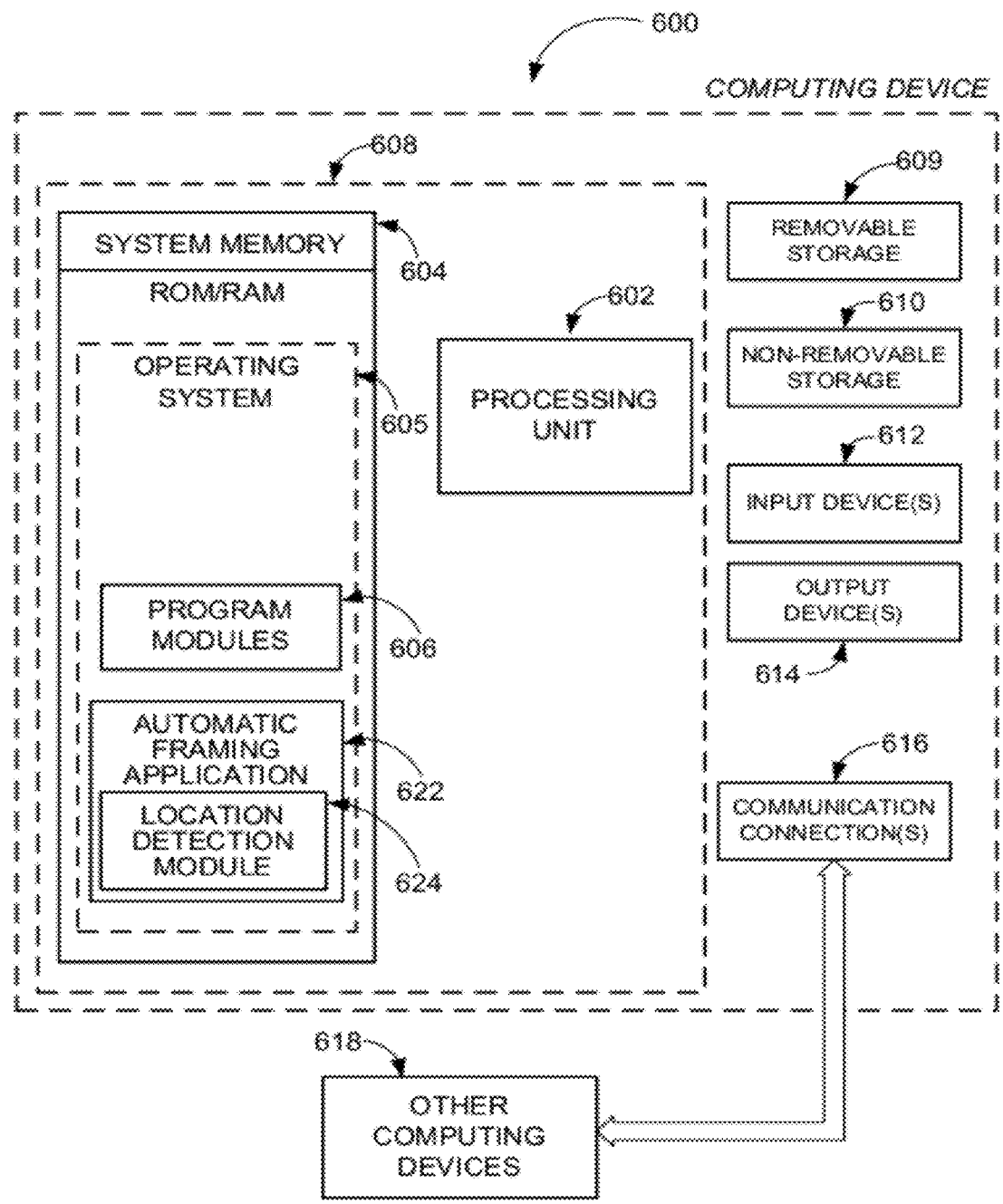
FIG. 6 is a block diagram of an example computing operating environment, where embodiments may be implemented.

FIG. 6 and the associated discussion are intended to provide a brief, general description of a suitable computing environment in which embodiments may be implemented. With reference to FIG. 6, a block diagram of an example computing operating environment for an application according to embodiments is illustrated, such as computing device 600. In a basic configuration, computing device 600 may be any computing device executing a presence based application according to embodiments and include at least one processing unit 602 and system memory 604. Computing device 600 may also include a plurality of processing units that cooperate in executing programs. Depending on the exact configuration and type of computing device, the system memory 604 may be volatile (such as RAM), non-volatile (such as ROM, flash memory, etc.) or some combination of the two. System memory 604 typically includes an operating system 605 suitable for controlling the operation of the platform, such as the WINDOWS® operating systems from MICROSOFT CORPORATION of Redmond, Wash. The system memory 604 may also include one or more software applications such as program modules 606, automatic framing application 622, and location detection module 624.

Location detection module 624 may enable a computing device 600 to continually identify occupants in a room and determine the physical location of the occupants and inanimate objects in the room corresponding to a depth camera's coordinate system. Through the location detection module 624, the automatic framing application 622 may enable a PTZ camera to adjust the pan, tilt, and zoom settings of the camera in order to center and maximize the occupants in the main video frame to produce a framed view, which may eliminate excess surrounding environment in the video frame. Automatic framing application 622 and location detection module 624 may be separate applications or integrated modules of a hosted service. This basic configuration is illustrated in FIG. 6 by those components within dashed line 608.

Computing device 600 may have additional features or functionality. For example, the computing device 600 may also include additional data storage devices (removable and/or non-removable) such as, for example, magnetic disks, optical disks, or tape. Such additional storage is illustrated in FIG. 6 by removable storage 609 and non-removable storage 610. Computer readable storage media may include volatile and nonvolatile, removable and non-removable media implemented in any method or technology for storage of information, such as computer readable instructions, data structures, program modules, or other data. System memory 604, removable storage 609 and non-removable storage 610 are all examples of computer readable storage media. Computer readable storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and which can be accessed by computing device 600. Any such computer readable storage media may be part of computing device 600. Computing device 600 may also have input device(s) 612 such as keyboard, mouse, pen, voice input device, touch input device, and comparable input devices. Output device(s) 614 such as a display, speakers, printer, and other types of output devices may also be included. These devices are well known in the art and need not be discussed at length here.

Computing device 600 may also contain communication connections 616 that allow the device to communicate with other devices 618, such as over a wired or wireless network in a distributed computing environment, a satellite link, a cellular link, a short range network, and comparable mechanisms. Other devices 618 may include computer device(s) that execute communication applications, web servers, and comparable devices. Communication connection(s) 616 is one example of communication media. Communication media can include therein computer readable instructions, data structures, program modules, or other data. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 7:
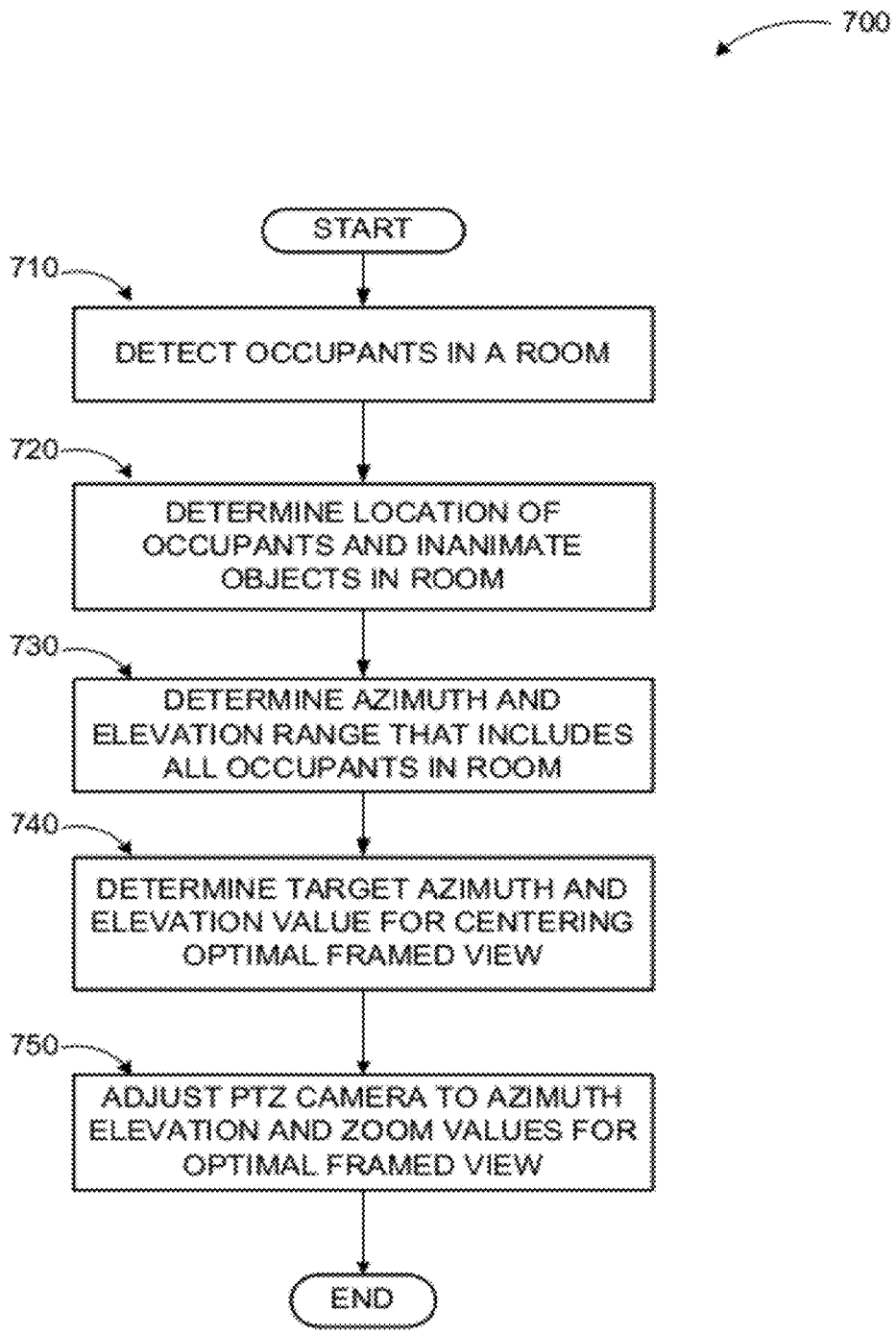
FIG. 7 illustrates a logic flow diagram for a process of providing an automatically adjustable framed view according to embodiments.

FIG. 7 illustrates a logic flow diagram for a process 700 of determining the location of occupants in a room and automatically providing a dynamically adjustable framed view of the occupants in a video conference environment according to embodiments. Process 700 may be implemented on a computing device that is coupled to one or more cameras for capturing a view within a conference room or similar location.

Process 700 begins with operation 710, where the system detects occupants in a room. The system may include a PTZ camera coupled with one or more depth cameras for identifying people in a room as well as detecting inanimate objects in the room such as tables, chairs, walls and display boards. At operation 720, the system determines the location of the occupants in the room as well as the location of the inanimate objects in the room in three dimensions. The depth cameras may use depth sensors to determine the location of the occupants and inanimate objects in the room by mapping their location in the depth camera coordinate system corresponding to the azimuth and elevation position in the room. The depth cameras may factor the location of the inanimate objects into the framing rules in order to provide an optimal framed view.

At operation 730, the system determines the range of azimuth and elevation values that includes all of the occupants in the room. The system may calculate the minimum and maximum azimuth and elevation values of the range that includes all of the occupants in the room, which may serve as the boundary values to which the system may zoom to produce an optimal framed view. At operation 740, based on the azimuth and elevation range values, the system may determine the target azimuth and elevation value for centering the framed view, which may be the mean of the minimum and maximum azimuth and elevation values in some embodiments. At operation 750, the system may adjust the PTZ camera's pan, tilt and zoom settings, keeping the target azimuth and elevation value at the center of the framed view and keeping the new minimum and maximum azimuth and elevation values as the boundary values for the framed view, thus capturing the occupants in the main video frame, maximizing and centering the occupants and eliminating the surrounding environment from the framed view.

The operations included in process 700 are for illustration purposes. Determining the location of occupants in a room and automatically providing a dynamically adjustable framed view of the occupants in a video conference environment may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method at least partially executed on a computing device for automatically providing a dynamically adjustable framed view of participants in a video conference environment, the method comprising:
  receiving a video stream input from an adjustable camera of a room;
  utilizing one or more depth cameras coupled with the adjustable camera:
    identifying one or more occupants in the room;
    determining locations of the one or more occupants in the room;
    determining locations of one or more inanimate objects in the room; and
    mapping the locations of the occupants and inanimate objects in the room according to the depth cameras' coordinate system; and
  setting one or more parameters of the adjustable camera based on the mapped locations to generate a framed view focusing on the occupants of the room.

2. The method of claim 1, wherein, the adjustable camera is a pan/tilt/zoom (PTZ) camera and the parameters of the adjustable camera include at least one from a set of: an azimuth value, an elevation value, and a zoom value.

3. The method of claim 1, wherein, the one or more depth cameras include one or more depth sensors.

4. The method of claim 3, wherein determining the locations of the people and inanimate objects further comprises:
  utilizing the one or more depth sensors to determine a minimum azimuth range and a minimum elevation range for the occupants of the room; and
  calibrating the adjustable camera's parameters based on the minimum azimuth range and the minimum elevation range.

5. The method of claim 4, further comprising:
  determining a maximum azimuth range and a maximum elevation range for the occupants of the room; and
  establishing the maximum azimuth range and the maximum elevation range as boundary values for the framed view.

6. The method of claim 5, further comprising:
  computing a mean of the maximum and minimum azimuth and elevation range values that include the occupants in the room; and
  setting the mean values as target azimuth and elevation values for a center of the framed view.

7. The method of claim 1, wherein setting one or more parameters of the adjustable camera further comprises:
adjusting the adjustable camera's pan and tilt settings to set a target azimuth value and a target elevation value as a center of the framed view; and
adjusting the adjustable camera's zoom setting such that all occupants of the room are in a field of view of the adjustable camera.

8. The method of claim 1, wherein the adjustable camera is one of: mechanical, digital, and a combination of mechanical and digital camera.

9. The method of claim 1, further comprising:
receiving two or more input video streams from one or more adjustable cameras capturing two or more views of occupants in the room;
automatically providing two or more framed views of occupants captured in the input video streams; and
displaying the two or more framed views concurrently in a main video frame as a split screen.

10. The method of claim 9, wherein the two or more input video streams are captured by a single adjustable camera configured to capture multiple video streams separately on a recorded delay and combine the multiple streams into a synchronized framed view.

11. The method of claim 1, further comprising:
adjusting the locations of the occupants based on the locations of the inanimate objects.

12. A computing device for automatically providing a dynamically adjustable framed view of participants in a video conference environment, the computing device comprising:
a memory;
a processor coupled to the memory, a pan/tilt/zoom (PTZ) camera, and at least two depth cameras, the processor executing video capture application, wherein the application is configured to:
detect locations of occupants of the room using the depth cameras;
compute a set of minimum azimuth/elevation and a set of maximum azimuth/elevation values that includes the occupants;
determine a target azimuth value and a target elevation value for the PTZ camera based on the minimum and maximum azimuth/elevation values;
adjust pan and tilt parameters of the PTZ camera based on the target azimuth and elevation values; and
set a zoom level of the PTZ camera such that all occupants are within the framed view.

13. The computing device of claim 12, wherein the video capture application is further configured to:
set the zoom level of the PTZ camera such that a select group of the occupants are within the framed view.

14. The computing device of claim 12, wherein the target azimuth and elevation values are determined from a mean of the respective minimum and maximum azimuth and elevation values.

15. The computing device of claim 12, wherein the target azimuth and elevation value are determined from azimuth and elevation values of an inanimate object in the room.

16. The computing device of claim 12, wherein the video capture application is further configured to:
dynamically track when locations of the occupants in the room changes;
automatically determine new locations of the people in the room;
adjust pan and tilt settings of the PTZ camera based on the new locations of the occupants in the room; and
automatically update the framed view to reflect the location changes of the occupants in the room.

17. A computer-readable memory device with instructions stored thereon for automatically providing a dynamically adjustable framed view of participants in a video conference environment, the instructions comprising:
detecting locations of occupants of the room using at least two depth cameras;
computing a set of minimum azimuth/elevation and a set of maximum azimuth/elevation values that includes the occupants;
determining a target azimuth value and a target elevation value for a pan/tilt/zoom (PTZ) camera based on the minimum and maximum azimuth/elevation values;
adjusting pan and tilt parameters of the PTZ camera based on the target azimuth and elevation values;
setting a zoom level of the PTZ camera such that all occupants are within the framed view; and
adjusting settings of the PTZ camera based on changes of the locations of the occupants in the room.

18. The computer-readable memory device of claim 17, wherein the instructions further comprise:
adjusting pan, tilt, and zoom settings based on detecting an interaction of an occupant with an inanimate object in the room.

19. The computer-readable memory device of claim 17, wherein the instructions further comprise:
employing a calibration table to map specific pixels of each depth camera to azimuth and elevation values; and
employing another calibration table for the PTZ camera to set the camera to the same azimuth and elevation values.

20. The computer-readable memory device of claim 17, wherein the target azimuth and elevation values are set as a center of the framed view and the maximum azimuth and elevation values are set as boundaries for the framed view.

* * * * *